(12) United States Patent
Harrison et al.

(10) Patent No.: US 8,768,594 B2
(45) Date of Patent: Jul. 1, 2014

(54) VEHICLE STABILITY CONTROL METHOD

(75) Inventors: Dudley Harrison, Solihull (GB); James Crawley, Warwickshire (GB); Robin Sayce-Jones, Worcestershire (GB)

(73) Assignee: Haldex Brake Products Ltd. (GB)

( * ) Notice: Subject to any disclaimer, the term of this patent is extended or adjusted under 35 U.S.C. 154(b) by 681 days.

(21) Appl. No.: 12/771,493

(22) Filed: Apr. 30, 2010

(65) Prior Publication Data

US 2010/0211283 A1 Aug. 19, 2010

Related U.S. Application Data

(63) Continuation of application No. PCT/GB2009/003583, filed on Oct. 23, 2008.

(30) Foreign Application Priority Data

Nov. 1, 2007 (GB) .................................. 0721463.8

(51) Int. Cl.
  *B60B 39/00* (2006.01)
  *B60T 7/12* (2006.01)
  *G06F 17/00* (2006.01)

(52) U.S. Cl.
  USPC ................... 701/71; 701/70; 701/72; 701/78; 701/82; 701/83; 701/1

(58) Field of Classification Search
  USPC .......... 701/1, 37–40, 45, 48, 70–84; 340/400; 180/197; 303/141, 194
  See application file for complete search history.

(56) References Cited

U.S. PATENT DOCUMENTS

| | | | |
|---|---|---|---|
| 3,797,893 A | 3/1974 | Burckhardt et al. | |
| 4,976,330 A | * 12/1990 | Matsumoto | 180/197 |
| 5,322,355 A | 6/1994 | Jonner | |
| 5,742,918 A | * 4/1998 | Ashrafi et al. | 701/70 |
| 5,825,284 A | * 10/1998 | Dunwoody et al. | 340/440 |
| 5,869,943 A | 2/1999 | Nakashima et al. | |

(Continued)

FOREIGN PATENT DOCUMENTS

| | | |
|---|---|---|
| DE | 19602879 C1 | 8/1997 |
| EP | 0684150 A1 | 11/1995 |

(Continued)

OTHER PUBLICATIONS

United Kingdom Search Report; GB 0721463.8; Mar. 12, 2008; 1 page.

(Continued)

*Primary Examiner* — Bhavesh V Amin
(74) *Attorney, Agent, or Firm* — St. Onge Steward Johnston & Reens LLC

(57) ABSTRACT

A method of controlling travel of a vehicle equipped with an antilock braking system, including the steps of determining potential for one or more wheels to lift off the ground, deactivating the system in respect of the wheels with the lift off potential so the speed of these wheels is not taken into consideration when determining if anti-lock braking is required, applying a low-level test braking force to one or more of the wheels that has the lift off potential, monitoring the speed of the one or more wheels, and if the test braking force causes the wheel speed to fall below a predetermined percentage of the vehicle speed, triggering a stability alarm signal and/or applying a controlled braking force to reduce the vehicle speed.

6 Claims, 3 Drawing Sheets

(56) References Cited

U.S. PATENT DOCUMENTS

| | | | |
|---|---|---|---|
| 6,002,975 A | 12/1999 | Schiffmann et al. | |
| 6,169,946 B1 | 1/2001 | Griessbach | |
| 6,176,555 B1 | 1/2001 | Semsey | |
| 6,253,123 B1 | 6/2001 | Schramm et al. | |
| 6,272,420 B1 | 8/2001 | Schramm et al. | |
| 6,278,930 B1 | 8/2001 | Yamada et al. | |
| 6,282,471 B1 * | 8/2001 | Burdock et al. | 701/38 |
| 6,304,805 B1 | 10/2001 | Onogi | |
| 6,321,141 B1 * | 11/2001 | Leimbach | 701/1 |
| 6,349,247 B1 | 2/2002 | Schramm et al. | |
| 6,356,188 B1 * | 3/2002 | Meyers et al. | 340/440 |
| 6,366,844 B1 | 4/2002 | Woywod et al. | |
| 6,397,127 B1 * | 5/2002 | Meyers et al. | 701/1 |
| 6,438,464 B1 | 8/2002 | Woywod et al. | |
| 6,498,976 B1 | 12/2002 | Ehlbeck et al. | |
| 6,553,284 B2 | 4/2003 | Holst et al. | |
| 6,559,634 B2 * | 5/2003 | Yamada | 324/174 |
| 6,593,849 B2 | 7/2003 | Chubb et al. | |
| 6,756,890 B1 | 6/2004 | Schramm et al. | |
| 6,772,625 B2 | 8/2004 | Frank | |
| 6,904,350 B2 * | 6/2005 | Lu et al. | 701/70 |
| 7,040,722 B2 | 5/2006 | Szabo et al. | |
| 7,085,642 B2 * | 8/2006 | Samuel et al. | 701/82 |
| 7,109,856 B2 * | 9/2006 | Lu et al. | 340/440 |
| 7,120,528 B2 * | 10/2006 | Salib et al. | 701/45 |
| 7,132,937 B2 * | 11/2006 | Lu et al. | 340/440 |
| 7,302,331 B2 * | 11/2007 | Meyers et al. | 701/71 |
| 7,688,191 B2 * | 3/2010 | Lu et al. | 340/446 |
| 2003/0225499 A1 | 12/2003 | Holler | |
| 2004/0019418 A1 * | 1/2004 | Lu et al. | 701/38 |
| 2004/0167701 A1 | 8/2004 | Mattson et al. | |
| 2005/0137767 A1 * | 6/2005 | Goebels et al. | 701/38 |
| 2006/0261937 A1 | 11/2006 | Lu et al. | |
| 2007/0138865 A1 | 6/2007 | Amato | |

FOREIGN PATENT DOCUMENTS

| | | |
|---|---|---|
| EP | 1142768 A2 | 10/2001 |
| EP | 1459949 A1 | 9/2004 |
| WO | 0222416 A1 | 3/2002 |

OTHER PUBLICATIONS

International Search Report; PCT/GB2008/003583; Jan. 20, 2009; 3 pages.

* cited by examiner

VEHICLE STABILITY CONTROL METHOD

CROSS-REFERENCE TO RELATED APPLICATIONS

The present application is a continuation of pending International patent application PCT/GB2008/003583 filed on Oct. 23, 2008, which designates the United States and claims priority from British patent application number 0721463.8 filed on Nov. 1, 2007, the content of which is incorporated herein by reference.

FIELD OF THE INVENTION

The invention relates to a vehicle stability control system, particularly, but not exclusively, for use in heavy goods vehicles equipped with an anti-lock braking system (ABS).

BACKGROUND OF THE INVENTION

When a vehicle, in particular a heavy goods vehicle, rounds a corner, if the speed of the vehicle is sufficiently high, forces on the vehicle during cornering can cause the vehicle wheels on the inside of the curve traveled by the vehicle to lift off the road. Under certain conditions, this can cause the vehicle to overturn. It is therefore known to provide an automatic stability control system which acts to apply the vehicle brakes, and/or control the engine throttle to reduce the speed of the vehicle, when wheel lift is detected, in order to minimise the risk of rollover.

One such system, for a vehicle comprising a tractor and trailer, is disclosed in U.S. Pat. No. 6,176,555. In this prior art system, when it is determined that a situation with potential for rollover exists, for example by monitoring the lateral acceleration of the vehicle, a low-level brake test pulse is applied to the wheels and the ABS control unit is monitored. If the application of the test pulse results in an ABS control intervention, it is deduced that wheel lift has occurred, and a stability control intervention is initiated.

SUMMARY OF THE INVENTION

This system has the advantage that it may be used with any trailer fitted with ABS, without requiring any modification to the trailer. A disadvantage is that ABS control is typically tuned to give a fast response in order to prevent complete wheel lock-up, and is often configured to initiate an ABS control intervention not only when the wheels reach a defined level of slip, but also if the wheel deceleration is sufficiently high. As such, an ABS control intervention may be initiated as a result of noise in the wheel speed signal generated by obstructions in the road, or by brief changes in road friction. By initiating a rollover stability intervention in response to initiation of an ABS control intervention, this system can give a false alarm or trigger a stability control intervention under conditions when no rollover is likely.

According to a first aspect of the invention, we provide a method of controlling travel of a vehicle equipped with an antilock braking system, the method comprising the steps of determining if there is potential for one or more wheels of the vehicle to lift off the ground, and if such a potential exists, deactivating the anti-lock braking system in respect of the wheels with the potential to lift off the ground so that the speed of these wheels is not taken into consideration when determining if anti-lock braking control is required, applying a low-level test braking force to the wheel or one of the wheels that has the potential to lift off the ground, monitoring the speed of the said wheel or wheels, and if the test braking force causes the speed of the or one or more of the monitored wheels to fall below a predetermined percentage of the vehicle speed, triggering a stability alarm signal and/or initiating a control intervention to reduce the vehicle speed.

Thus, by virtue of deactivating the ABS system whilst testing to establish if a stability control intervention is required, and using wheel slip to determine if there is wheel lift, there are fewer false alarms when rollover is unlikely, and, where the method implements a stability control intervention, there is no initial reduction in braking pressure as a result of an ABS control intervention before the increase in braking pressure required to increase vehicle stability is achieved.

Preferably, the control intervention includes applying a controlled braking force to one or more of the wheels which do not have potential to lift off the ground so as to reduce the vehicle speed.

Where the method includes initiating control intervention, the method further includes the steps of monitoring the potential for one or more of the vehicle wheels to lift off the ground, and ceasing the control intervention when the potential for one or more of the vehicle wheels to lift off the ground is no longer present. Alternatively, the method may include the steps of applying further low level test braking pulses to the wheel or wheels which has the potential to lift off the ground, monitoring the speed of the or each of the said wheels, and ceasing the control intervention when the speed of the or each of the monitored wheels does not change significantly relative to the speed of the vehicle following the application of the test braking pulse.

The method of determination of the potential for one or more of the vehicle wheels to lift off the ground may include measurement of the lateral acceleration of the vehicle.

Preferably, if it is determined that there is potential for one or more of the wheels to lift of the ground during braking following braking demand from a driver of the vehicle, or if the driver issues a demand for braking during a braking test pulse, where the braking demand requires a braking force which is below a predetermined level, the braking demand is met by increasing the braking force applied to the wheels without potential to lift off the ground by a greater amount that the braking force applied to the wheels with potential to lift off the ground.

According to a second aspect of the invention we provide a vehicle braking system comprising an electronic control unit of an electronic braking system including antilock braking control, the control unit being adapted to provide a braking signal to a plurality of brake actuators associated with wheels on first and second sides of the vehicle, wherein the control unit has the capability of determining if there is potential for one or more wheels of the vehicle to lift off the ground, and if such a potential exists, deactivating the anti-lock braking system in respect of the wheels with the potential to lift off the ground so that the speed of these wheels is not taken into consideration when determining if anti-lock braking control is required, generating a braking signal to apply a low-level test braking force to the wheel or one of the wheels that has the potential to lift off the ground, monitoring the speed of the said wheel or wheels, and if the test braking force causes the speed of the or one or more of the monitored wheels to fall below a predetermined percentage of the vehicle speed, triggering a stability alarm signal and/or initiating a control intervention to reduce the vehicle speed.

BRIEF DESCRIPTION OF THE DRAWINGS

An embodiment of the invention will now be described, by way of example only, with reference to the following drawings.

DETAILED DESCRIPTION OF THE INVENTION

Figure 3:
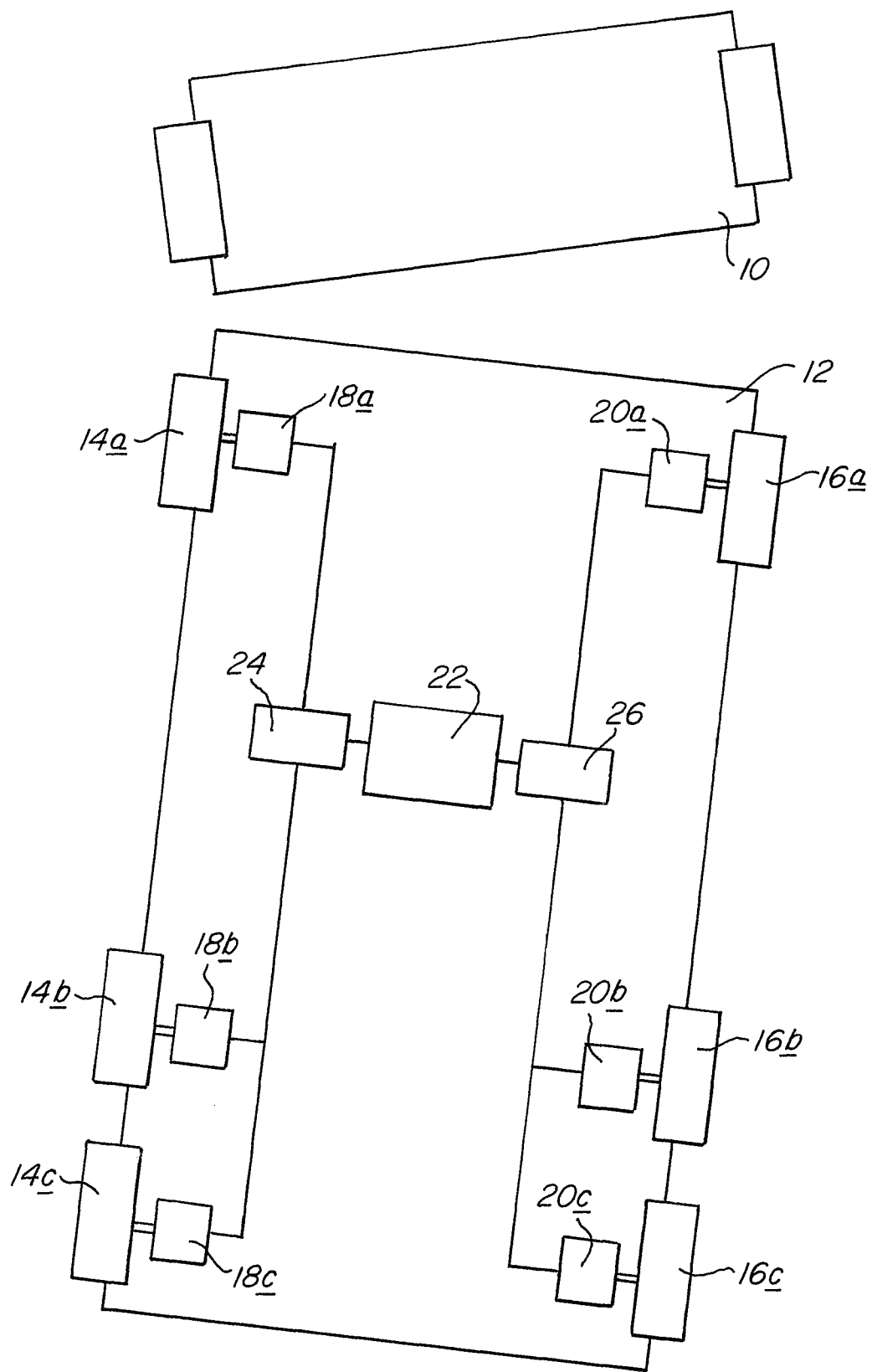
FIG. 3 is a schematic illustration of a vehicle equipped with a braking control system according to a second aspect of the invention.

Referring first to FIG. 3, there is provided a vehicle, in this example a heavy goods vehicle comprising a tractor 10 and a trailer 12, fitted with a conventional electrical braking system (EBS) including anti-lock braking (ABS). The trailer 12 has six wheels, three of which 14a, 14b, 14c are provided on a first side of the trailer 12, and three of which 16a, 16b, 16c are provided on a second side of the trailer 12. Each wheel is fitted with a wheel speed sensor (not shown) and a brake (not shown) which is operable by means of a brake actuator 18a, 18b, 18c, 20a, 20b, 20c. The braking system also includes a central electronic control unit (ECU) 22, which is electrically connected to each of the brake actuators 18a, 18b, 18c, 20a, 20b, 20c, the wheel speed sensors, and to a driver operated brake pedal or lever, as is conventional in such systems.

The central ECU 22 is programmed to receive a braking demand signal from the brake pedal or lever, and transmit an appropriate braking signal to the brake actuators 18a, 18b, 18c, 20a, 20b, 20c so that the brake actuators 18a, 18b, 18c, 20a, 20b, 20c apply sufficient braking force to each vehicle wheel 14a, 14b, 14c, 16a, 16b, 16c to produce the desired vehicle braking. The central ECU also receives wheel speed signals from each of the wheel speed sensors, and is programmed to detect when any of the wheels locks, and to modify the braking signal in accordance with standard ABS control algorithms In this embodiment of the invention, the brake actuators 18a, 18b, 18c, 20a, 20b, 20c are operated pneumatically, the electronic braking control signal generated by the central ECU being converted by a modulator to a pneumatic braking signal which is then transmitted to one or more of the brake actuators. The invention may, of course, be applied to a braking system in which the brake actuators are hydraulically or electrically operated.

Moreover, in this embodiment of the invention, the trailer 12 is provided with two modulators, the first modulator 24 providing a pneumatic braking signal to the brake actuators 18a, 18b, 18c at the first side of the trailer 12, and the second modulator 26 providing a pneumatic braking signal to the brake actuators 20a, 20b, 20c at the second side of the trailer 12. It will be appreciated that the invention may, however, be applied to a trailer having a single modulator which provides a pneumatic braking signal to all the brake actuators or to a trailer having more than two modulators, so that the brake actuators associated with wheels on each side of the trailer are provided with a pneumatic braking signal from a plurality of modulators.

Figure 1:
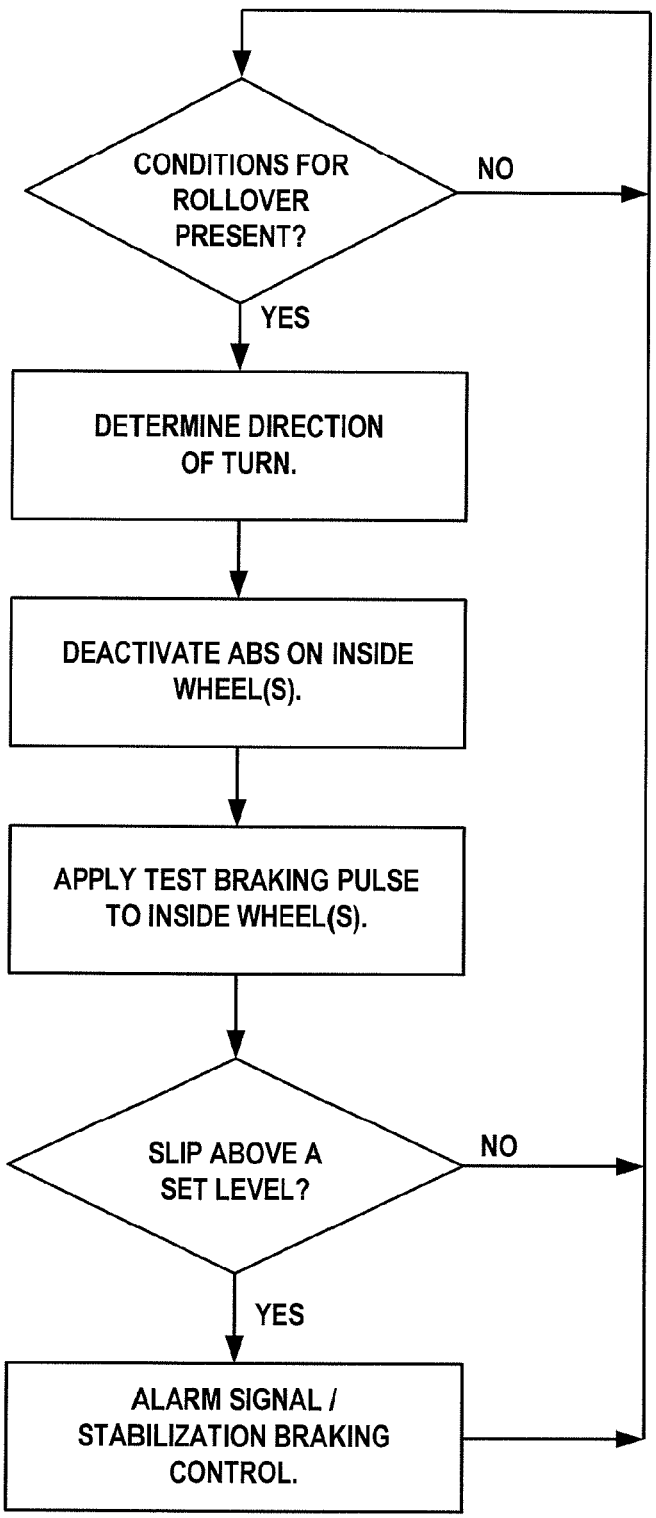
FIG. 1 is a flow chart illustrating a braking control method according to the first aspect of the invention.

The vehicle is also equipped with at least one accelerometer which is configured to measure the lateral acceleration of the vehicle. The accelerometer is connected to the central ECU 22, so that the central ECU 22 can detect when the vehicle is turning. The central ECU 22 is programmed such that when the lateral acceleration of the vehicle exceeds a predetermined value, it uses the lateral acceleration input to determine which way the vehicle is turning, and deactivates the ABS control of the wheels 14a, 14b, 14c on the inside of the vehicle's turning curve such that the wheel speed of each of the inside wheels 14a, 14b, 14c is not taken into consideration when determining whether an ABS intervention is required, i.e. the ABS system operates in "Select High" mode, and if it is determined that ABS control is required, the braking pressure to the outside wheels only is modified accordingly. The central ECU 22 also sends a braking signal to the modulator 24 providing a pneumatic braking signal to the brake actuators 18a, 18cb, 18c associated with these wheels 14a, 14b, 14c so as to apply a low level test braking pulse to each of the inside wheels 14a, 14b, 14c, and uses the wheel speed sensors to monitor the speed of each of the inside wheels 14a, 14b, 14c. This process is illustrated in FIG. 1. Normal ABS control is resumed after the test pulse has been applied.

The magnitude of the braking force applied to each of the inside wheels 14a, 14b, 14c is such that with full or substantially full adhesion between the wheels 14a, 14b, 14c and the road, the braking force would have little impact on the wheel speed. If, however, adhesion between any of the inside wheels 14a, 14b, 14c and the road is reduced because the inside wheels 14a, 14b, 14c are tending to lift off the road, the test braking force is sufficiently high to cause the wheel in question to stop or slow down until there is a high level of slip between the road and the wheel. It has been found that the application of the test braking pulse to a non-lifting wheel can cause an initial rapid deceleration of the wheel, but this initial deceleration is short lived, and does not result in any significant degree of wheel slip. As such, the system is configured such that the deceleration of the wheel is not taken into consideration when assessing whether a stability control intervention is required, and, if the central ECU detects that the slip between the road and any of any of the inside wheels 14a, 14b, 14c exceeds a predetermined amount following application of the test braking pulse, this is taken as an indication that lift of the inside wheels 14a, 14b, 14c is occurring and that there is a possibility that vehicle rollover may occur.

In this embodiment of the invention, if wheel lift is detected, the central ECU 22 is programmed to initiate a stability control braking intervention, and send a braking signal to the modulator 26 providing a pneumatic braking signal to the brake actuators 20a, 20b, 20c associated with the outside, non-lifting wheels 16a, 16b, 16c so as to slow the vehicle down, and hence reduce the likelihood of rollover. It will be appreciated, however, that the control intervention could comprise other means of reducing the vehicle speed, such as throttling the vehicle engine. Alternatively, if wheel lift is detected, the central ECU may be programmed to generate a rollover alarm signal, which may comprises an audible or visual alarm or both, to alert the driver that braking is required to reduce the vehicle speed, and hence avoid rollover.

As mentioned above, normal ABS control is resumed after the test braking pulse has been applied. There will inevitably be some delay before this occurs, and it is likely that for the first few milliseconds of the stability control intervention, the ABS is operated in "Select High" mode before normal ABS control is resumed. This can be advantageous as the inside wheels (low friction) wheels are more likely to lock as a result of the stability control braking than the outside wheels, and this means that, for the first few milliseconds of the stability control intervention, there is less likely to be an ABS control intervention (which would act to decrease the braking, and hence counteract the aim of reducing the vehicle speed to avoid rollover) than if the ABS is operating in the normal Select Low mode.

Also in this embodiment of the invention, the central ECU 22 is programmed to monitor the wheel speed of all of the inside wheels following the braking test pulse, and to initiate a stability control braking intervention or generate a rollover alarm signal when the results indicate that all of the inside wheels 14a, 14b, 14c have lifted off the ground. It will be appreciated however, that the central ECU 22 could be programmed to monitor the wheel speed of only a selected proportion of the inside wheels 14a, 14b, 14c and/or to initiate a stability control intervention or generate a rollover alarm signal when only one or a selected fraction of the inside wheels 14a, 14b, 14c are lifting off the ground.

The duration of the stability control braking intervention is set by determining when the condition which prompted the initiation of the test braking pulse no longer exists, i.e. in this case, when the lateral acceleration of the vehicle falls below the predetermined value, the central ECU 22 acts to terminate application of the stability control braking force.

It will be appreciated however, that this is likely to result in over-braking of the vehicle, as the control intervention will continue after the inside wheels 14a, 14b, 14c have returned to the road, and after rollover ceases to be a possibility. This can cause irritation to the driver of the vehicle. The duration of the stability control braking intervention need not be set in this way, however.

Figure 2:
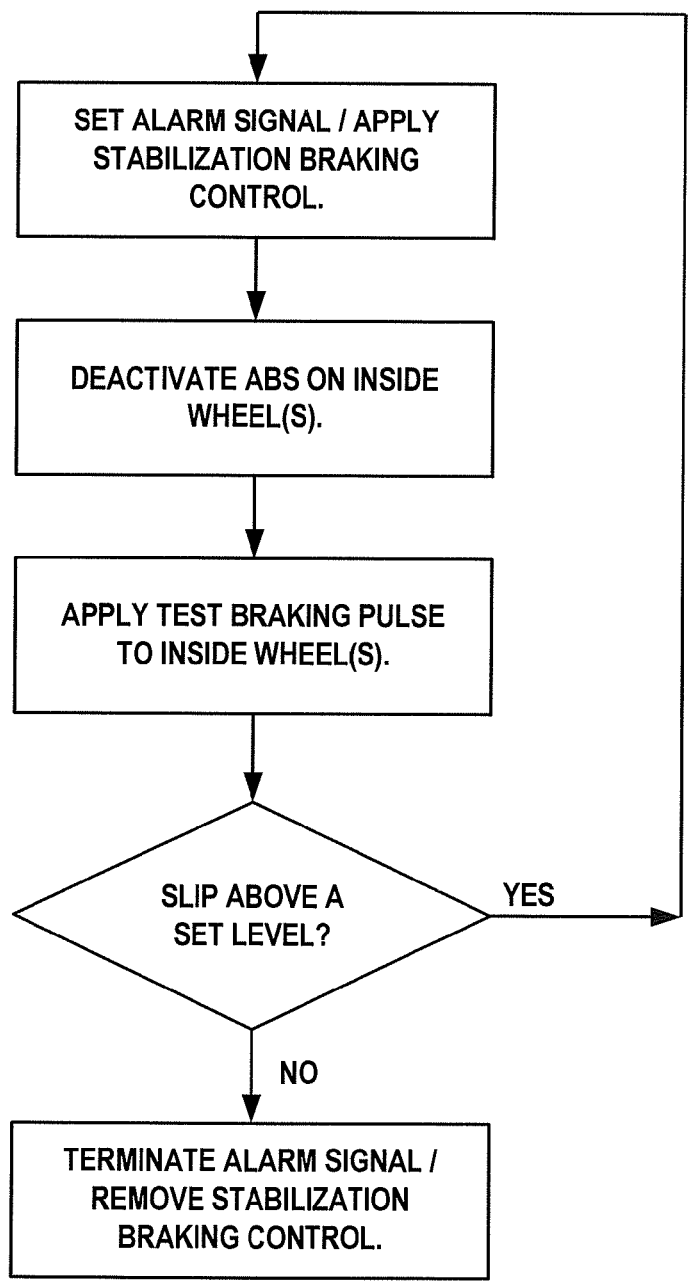
FIG. 2 is a further flow chart illustrating in more detail an alternative embodiment of the "Alarm signal/stabilization" step in the flow chart of FIG. 1.

In an alternative embodiment of the invention, the end of stability control braking intervention may be determined by, during the control intervention, deactivating the ABS control in relation to the inside wheels 14a, 14b, 14c, applying further low level braking test pulses to the inside wheels 14a, 14b, 14c and monitoring the speed of the inside wheels 14a, 14b, 14c in the same way as described above, in order to detect the reduction in slip when the adhesion is restored. Also as described above, if, in response to the test pulse, there is no significant increase in slip, it can be assumed that there is good contact between the wheel and the road, and therefore that the wheel in question is no longer lifting. The stability control braking intervention can thus be terminated when all, or at least some, of the inside wheels 14a, 14b, 14c are determined to be in contact with the road once more. This process is illustrated in FIG. 2.

This embodiment of the invention may also be adapted to accommodate the need for a braking test pulse arising during driver braking. Should the driver apply the brakes, or the need for a braking test pulse arise during driver braking, in order to ensure that the braking system delivers a total braking level which meets the driver demand, the braking level can be distributed between the modulators 24, 26 on the trailer. In other words, in order to apply a low level braking test pulse to the inside wheels 14a, 14b, 14c, the braking force applied to the inside wheels 14a, 14b, 14c as a result of driver demand may be reduced, and the braking force applied to the outside wheels 16a, 16b, 16c increased to compensate for the reduction in braking on the inside wheels 14a, 14b, 14c and give the desired total braking force.

If the driver braking demand is sufficiently high, however, it may not be possible to increase the braking force on the outside wheels 16a, 16b, 16c enough to compensate for the reduction required to allow for a low level braking test pulse on the inside wheels 14a, 14b, 14c. In this case, the high level of braking demand is likely to slow the vehicle sufficiently to avoid rollover, and at such levels, the system is configured to apply the driver specified braking without any modification, i.e. without applying a low level test pulse.

As mentioned above, the description so far relates to a vehicle with two modulators 24, 26 which control brake actuators 14a, 14b, 14c, 16a, 16b, 16c on opposite sides of the vehicle. It will be appreciated that the system operates slightly differently in a vehicle with only a single modulator, as, in this case, it is not possible for a different braking force to be applied to the wheels on one side of the vehicle to the other. As a result, when the test braking pulse is applied to the inside wheels, the ABS system is deactivated for the inside wheels to the extent that the speed of the inside wheels is not taken into consideration when determining whether ABS control intervention is required, i.e. the ABS system operates in "Select High" mode, but the braking force on the inside wheels is altered along with the braking force on the outside wheels during any subsequent ABS control intervention.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A method of controlling travel of a vehicle equipped with an antilock braking system, the method comprising the steps of:
   determining a potential for one or more wheels of the vehicle to lift off the ground;
   deactivating the anti-lock braking system in respect of the wheels with the potential to lift off the ground so that the speed of these wheels is not taken into consideration when determining to apply anti-lock braking control;
   applying a low-level test braking force to the wheels with the potential to lift off the ground;
   monitoring the speed of the wheels with the potential to lift off the ground;
   triggering a stability alarm signal and/or initiating a control intervention to reduce the vehicle speed when the test braking force causes the speed of the wheels with the potential to lift off the ground falls below a predetermined percentage of the vehicle speed; and
   increasing the braking force applied to the wheels without potential to lift off the ground by a greater amount than the braking force applied to the wheels with potential to lift off the ground when it is determined that there is potential for one or more of the wheels to lift off the ground during braking following braking demand from a driver of the vehicle, or when the driver issues a demand for braking during a braking test pulse, where the braking demand requires a braking force which is below a predetermined level.

2. The method of claim 1, wherein the step of initiating a control intervention includes applying a controlled braking force to one or more of the wheels which do not have potential to lift off the ground so as to reduce the vehicle speed.

3. The method of claim 1, further comprising monitoring the potential for one or more of the vehicle wheels to lift off the ground, and ceasing the control intervention when the potential for one or more of the vehicle wheels to lift off the ground is no longer present.

4. The method of claim 1, further comprising applying further low level test braking pulses to the wheel or wheels which has the potential to lift off the ground, monitoring the speed of the or each of the said wheels, and ceasing the control intervention when the speed of the or each of the monitored wheels does not change significantly relatively to the speed of the vehicle following the application of the test braking pulse.

5. The method of claim 1, wherein determining the potential for one or more of the vehicle wheels to lift off the ground includes measuring the lateral acceleration of the vehicle.

6. A vehicle braking system comprising:

an electronic control unit of an electronic braking system including antilock braking control, the control unit being operable to provide a braking signal to a plurality of brake actuators associated with wheels on first and second sides of the vehicle, the control unit having the capability of determining a potential for one or more wheels of the vehicle to lift off the ground, wherein the control unit performs a method according to the following steps:

deactivating the anti-lock braking system in respect of the wheels with the potential to lift off the ground so that the speed of these wheels is not taken into consideration when determining to apply anti-lock braking control, generating a braking signal to apply a low-level test braking force to the wheel or one of the wheels that has the potential to lift off the ground, monitoring the speed of the said wheel or wheels, and triggering a stability alarm signal and/or initiating a control intervention to reduce the vehicle speed when the test braking force causes the speed of the or one or more of the monitored wheels to fall below a predetermined percentage of the vehicle speed, and increasing the braking force applied to the wheels without potential to lift off the ground by a greater amount than the braking force applied to the wheels with potential to lift off the ground when it is determined that there is potential for one or more of the wheels to lift of the ground during braking following braking demand from a driver of the vehicle, or when the driver issues a demand for braking during a braking test pulse, where the braking demand requires a braking force which is below a predetermined level.

* * * * *